(12) United States Patent
Takahashi

(10) Patent No.: US 8,549,886 B2
(45) Date of Patent: Oct. 8, 2013

(54) GRAPHITE HEATING FURNACE

(75) Inventor: Tadashi Takahashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 1046 days.

(21) Appl. No.: 11/670,122

(22) Filed: Feb. 1, 2007

(65) Prior Publication Data
US 2007/0180862 A1 Aug. 9, 2007

(30) Foreign Application Priority Data

Feb. 6, 2006 (JP) ................. 2006-028326

(51) Int. Cl.
C03B 7/14 (2006.01)
(52) U.S. Cl.
USPC ............... 65/484; 65/507; 65/509; 65/374.15
(58) Field of Classification Search
USPC ................. 65/484, 507, 509, 374.15
See application file for complete search history.

(56) References Cited

U.S. PATENT DOCUMENTS 4,030,901 A * 6/1977 Kaiser ............................. 65/424
4,032,290 A * 6/1977 Soderlund et al. ............. 432/200
5,041,186 A * 8/1991 Nishio et al. ..................... 117/15
5,533,930 A * 7/1996 Tsuzuki et al. ................ 432/120
2006/0117801 A1* 6/2006 Saitou et al. ..................... 65/422

FOREIGN PATENT DOCUMENTS

| JP | 62-149798 U | 9/1987 |
| JP | 63-60124 | 3/1988 |
| JP | 6-10006 | 1/1994 |
| JP | 2000-143385 | 5/2000 |
| JP | 2002-173333 | 6/2002 |
| JP | 2003-212582 | 7/2003 |
| JP | 2005-225947 | 8/2005 |

OTHER PUBLICATIONS

English translation of JP 62-149798U, External Heating Type Core Tube Furnace, Jinsei Shintaku et al. Aug. 22, 1987.*
Japanese Office Action issued Aug. 30, 2011, in Patent Application No. 2006-028326.
Office Action issued May 22, 2012 in Japanese Patent Application No. 2006-028326 (with English translation).

* cited by examiner

Primary Examiner — Queenie Dehghan
(74) Attorney, Agent, or Firm — Oblon, Spivak, McClelland, Maier & Neustadt, L.L.P.

(57) ABSTRACT

A gas supplying unit supplies a nitrogen gas into a furnace body of a graphite heating furnace in which at least a part of the furnace body is formed with a graphite. An exhausting unit exhausts a gas inside the furnace body to outside the furnace body. A dew-point temperature of the nitrogen gas supplied into the furnace body is equal to or lower than −80° C. A pressure inside the furnace body is equal to or higher than 140 Pa with respect to an atmospheric pressure outside the furnace body.

7 Claims, 4 Drawing Sheets

GRAPHITE HEATING FURNACE

BACKGROUND OF THE INVENTION

1. Field of the Invention

The present invention relates to a graphite heating furnace of which at least a part of a furnace body is formed with a graphite.

2. Description of the Related Art

Conventionally, a carbon resistance furnace is commonly used as a heating furnace for a variety of applications requiring a high temperature. The carbon resistance furnace is an electric furnace that employs a graphite in its heating element, having a feature of easily obtaining a high temperature. The graphite is widely used in the heating furnace as a part besides the heating element, such as a heat insulating member and a packing, due to the characteristics of high resistance to heat, small thermal expansion, as well as easy machining. In the present specification, a heating furnace in which at least of part of the heating furnace, particularly, a furnace body of the heating furnace is formed with the graphite is referred to as a graphite heating furnace.

Typically, the graphite heating furnace includes a reaction container in which an object to be heated is placed and a furnace body that encloses the reaction container. Inside the furnace body is maintained in an inert gas atmosphere so that the heating element and the heat insulating member are not degraded from oxidization, and is kept in a positive pressure state with respect to the atmosphere so that the external air does not penetrate into the furnace body. In general, an argon gas is used as the inert gas filled in the furnace body, because the nitrogen gas reacts with the graphite, which generates an extremely poisonous hydrogen-cyanide gas (HCN).

However, from a point of practically view, it is desired to use the nitrogen for the inert gas filled in the furnace body because the argon gas is expensive compared to the nitrogen gas. Therefore, it is required to realize a graphite heating furnace in which the hydrogen-cyanide gas is not generated even when the nitrogen gas is filled in the furnace body. To cope with the problem, a conventional technology has been disclosed for a high-frequency induction heating furnace employing a graphite muffle tube, in which an inner-side portion where the muffle tube is disposed is isolated from an outer-side portion where a high-frequency induction coil is disposed, so that an inert gas other than the nitrogen gas, such as the argon gas, is filled in the inner-side portion, and the nitrogen gas is filled in the outer-side portion (see, for example, Japanese Patent Application Laid-Open No. 2002-173333). In other words, the conventional technology isolates a space in which the graphite is used from a space in which the graphite is not used, and fills the nitrogen gas only in the space in which the graphite is not used.

However, in the conventional technology, a necessity of isolating the spaces with a high airtightness causes another problem that a structure of an isolation wall and the like to realize the isolation performance becomes complicated. In addition, it is still necessary to use the expensive argon gas in the space in which the graphite is used.

SUMMARY OF THE INVENTION

It is an object of the present invention to at least partially solve the problems in the conventional technology.

A graphite heating furnace according to one aspect of the present invention includes a furnace body at least a part of which is formed with a graphite; a gas supplying unit that supplies a nitrogen gas into the furnace body; and an exhausting unit that exhausts a gas inside the furnace body to outside the furnace body. A dew-point temperature of the nitrogen gas supplied into the furnace body is equal to or lower than −80° C. A pressure inside the furnace body is equal to or higher than 140 Pa with respect to an atmospheric pressure outside the furnace body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
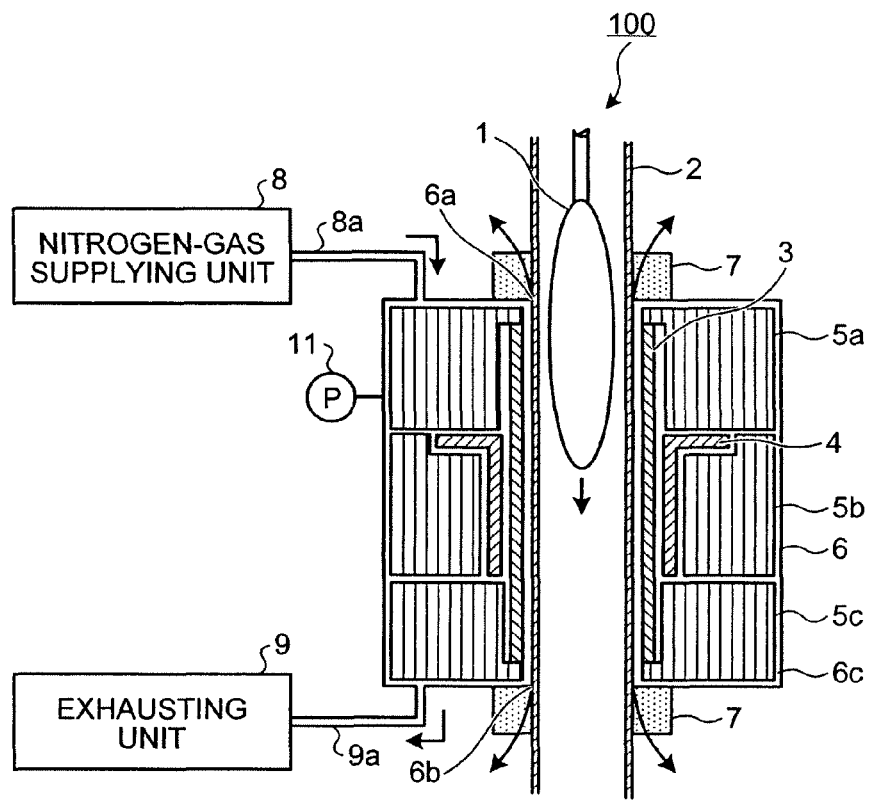
FIG. 1 is a schematic diagram for explaining a structure of a graphite heating furnace according to a first embodiment of the present invention.

Exemplary embodiments according to the present invention will be explained in detail below with reference to the accompanying drawings. It should be noted that the present invention is not limited to the exemplary embodiments. In the drawings used in the specification, the same parts are assigned with the same reference numerals.

FIG. 1 is a schematic diagram for explaining a structure of a graphite heating furnace 100 according to a first embodiment of the present invention. As shown in FIG. 1, the graphite heating furnace 100 is configured as a dehydration-sintering furnace that dehydrates and sinters a porous preform 1 for an optical-fiber, including a muffle tube 2 into which the porous preform 1 is introduced, a muffle tube 3 that surrounds an outer circumference of the muffle tube 2, a heater 4 that surrounds an outer circumference of the muffle tube 3, and heat insulating members 5a to 5c that surround an outer circumference of the muffle tube 3 or the heater 4.

The muffle tube 2 is generally formed with a silica. A gas that is necessary to dehydrate and sinter the porous preform 1 flows inside the muffle tube 2, such as a helium gas and a chlorine gas. The porous preform 1 is introduced into the muffle tube 2 from the upper side in FIG. 1 by a conveying mechanism (not shown). The porous preform 1 is heated and dehydrated or sintered while descending slowly along the muffle tube. Each of the muffle tube 3, the heater 4, and the heat insulating members 5a to 5c is formed in a cylindrical shape using the graphite, and is arranged coaxially in a furnace body 6. The muffle tube 2 is held in a state of being inserted in the furnace body 6, and each of spaces 6a and 6b between the muffle tube 2 and the furnace body 6 at an upper portion and a lower portion of the furnace body 6 is sealed by a ring-shaped seal member 7 that has permeability, heat insulating property, and elasticity. As for the seal member 7, for example, a felt formed with a glass fiber is used.

The graphite heating furnace 100 includes a nitrogen-gas supplying unit 8 that supplies a nitrogen gas into the furnace body 6, an exhausting unit 9 that exhausts a gas inside the furnace body 6 to outside the furnace body 6, and a pressure gauge 11. In addition, an exhaust-gas treatment equipment (not shown) that detoxifies an exhaust gas is provided at an subsequent stage of the exhausting unit 9. The nitrogen-gas supplying unit 8 supplies the nitrogen gas into the furnace body 6 through a gas feeding tube 8a that is connected to the upper portion of the furnace body 6. A dew-point temperature of the nitrogen gas supplied by the nitrogen-gas supplying unit 8 is set within a predetermined temperature range.

The nitrogen gas introduced into the furnace body 6 is filled in a space 6c that is a space enclosed by the muffle tube 2 and the furnace body 6 and formed by the muffle tube 3, the heater 4, and the heat insulating members 5a to 5c, so that inside the furnace body 6 becomes a nitrogen-gas atmosphere. With this scheme, in the graphite heating furnace 100, it becomes possible to prevent an oxidative consumption of the muffle tube 3, the heater 4, and the heat insulating members 5a to 5c, even when a temperature of the furnace body 6 becomes high.

The exhausting unit 9 is coupled into the furnace body 6 through an exhausting tube 9a that is connected to the lower portion of the furnace body 6, intakes the gas inside the furnace body 6 from the space 6c, and exhausts the gas to outside the furnace body 6. At this moment, an amount of supplying the nitrogen gas by the nitrogen-gas supplying unit 8 and an amount of exhausting the gas by the exhausting unit 9 are controlled so that a pressure detected by the pressure gauge 11 is equal to or higher than 140 Pa with respect to the atmosphere outside the furnace body 6. The pressure inside the furnace body 6 is determined by a balance between the amount of the nitrogen gas supplied into the furnace body 6 and the amount of the gas exhausted from the furnace body 6.

In this manner, in the graphite heating furnace 100, an amount of the hydrogen-cyanide gas generated by a reaction of the graphite that is used in the muffle tube 3, the heater 4, and the heat insulating members 5a to 5c with the nitrogen gas filled in the space 6c is suppressed within a safe range in handling the hydrogen-cyanide gas. Therefore, a part of the gas inside the furnace body 6 can be discharged to the atmosphere, i.e., a room where there is an operator, from the spaces 6a and 6b that function as a discharging unit.

Generally, because the muffle tube 2 that is formed with the silica has a low rigidity, it is technically difficult to seal the space between the muffle tube 2 and the furnace body 6 with a high airtightness. In fact, even if a sealing of the space is realized, the structure of the sealing becomes extremely complicated. On the other hand, in the graphite heating furnace 100, it is possible to seal the space with a simple mechanism such as the seal member 7, because the gas inside the furnace body 6 can be discharged from the spaces 6a and 6b so that the high airtightness is not required for the spaces 6a and 6b. In addition, by discharging a part of the gas inside the furnace body 6 to the atmosphere, an amount of gas to be treated by the exhaust-gas treatment equipment (not shown) that is provided at the subsequent stage of the exhausting unit 9 is reduced; and therefore, it is possible to reduce a load on the exhaust-gas treatment equipment.

The hydrogen-cyanide gas is designated as a poisonous substance by the Poison Law, and a standard control concentration of the hydrogen-cyanide gas is defined to be equal to or less than 5 parts per million (ppm) in The Industry Hygienics Society of Japan. Based on the defined value, the graphite heating furnace 100 provides an indication of a tolerance of the hydrogen-cyanide gas concentration (HCN concentration) in the furnace body 6 as a concentration slightly higher than 5 ppm (about 20 ppm). Even when the hydrogen-cyanide gas of a concentration of about 20 ppm is discharged from the furnace body 6 to the atmosphere, it is considered that the hydrogen-cyanide gas concentration certainly becomes equal to or less than 5 ppm at a place where there is an operator outside the furnace body 6 because of a fast diffusion of the gas at the time of discharge.

Figure 2:
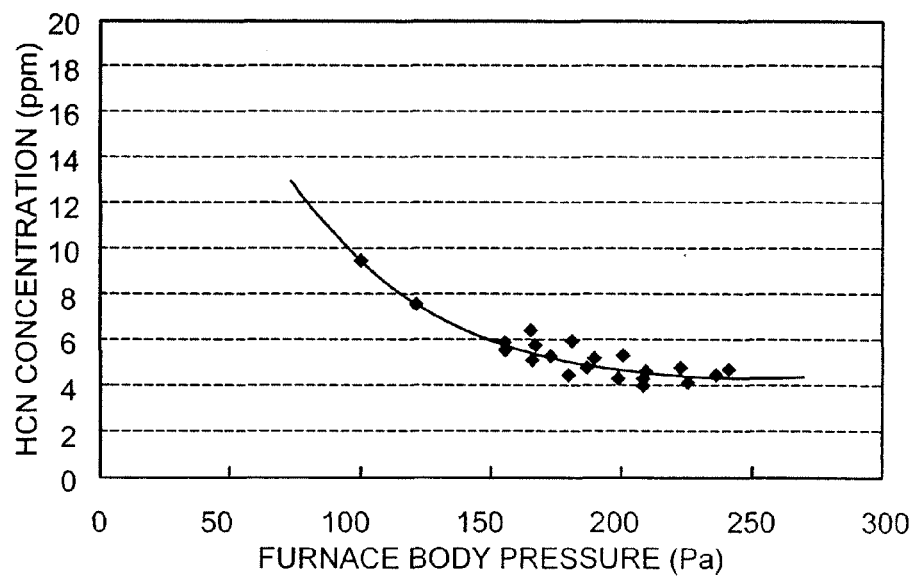
FIG. 2 is a graph for explaining a relation between a furnace body pressure of the graphite heating furnace and an HCN concentration inside the furnace body.

FIG. 2 is a graph for explaining a relation between a furnace body pressure and the HCN concentration inside the furnace body 6. The graph shown in FIG. 2 is a result obtained from an actual measurement when a temperature of the heater 4 is set to 1900 degrees Kelvin (K), and a dew-point temperature of the nitrogen gas supplied by the nitrogen-gas supplying unit 8 is set to −90° C. The furnace body pressure shown in FIG. 2 is a relative pressure with respect to the atmosphere outside the furnace body 6.

As shown in FIG. 2, the HCN concentration monotonically decreases as the furnace body pressure increases, and when the furnace body pressure is equal to or higher than about 140 Pa with respect to the atmosphere outside the furnace body 6, the HCN concentration becomes substantially minimized, with a substantial minimum value of equal to or less than 5 ppm.

Therefore, it is desired to set the furnace body pressure so that the HCN concentration inside the furnace body 6 with respect to the furnace body pressure is substantially minimized, and more preferably, to a pressure equal to or higher than 140 Pa. When the furnace body pressure is maintained within the above range, the HCN concentration inside the furnace body 6 becomes equal to or less than 7 ppm, which is a level that does not cause a problem even if the gas inside the furnace body 6 is discharged to the atmosphere. From a point of practical view considering a usage amount of the nitrogen gas, it is desired to keep the furnace body pressure lower than 1,000 Pa.

Based on the above result, in the graphite heating furnace 100, the amount of the nitrogen gas supplied by the nitrogen-gas supplying unit 8 and the amount of gas exhausted by the exhausting unit 9 are controlled so that the furnace body pressure is constantly kept equal to or higher than 140 Pa with respect to the atmosphere outside the furnace body 6.

Figure 3:
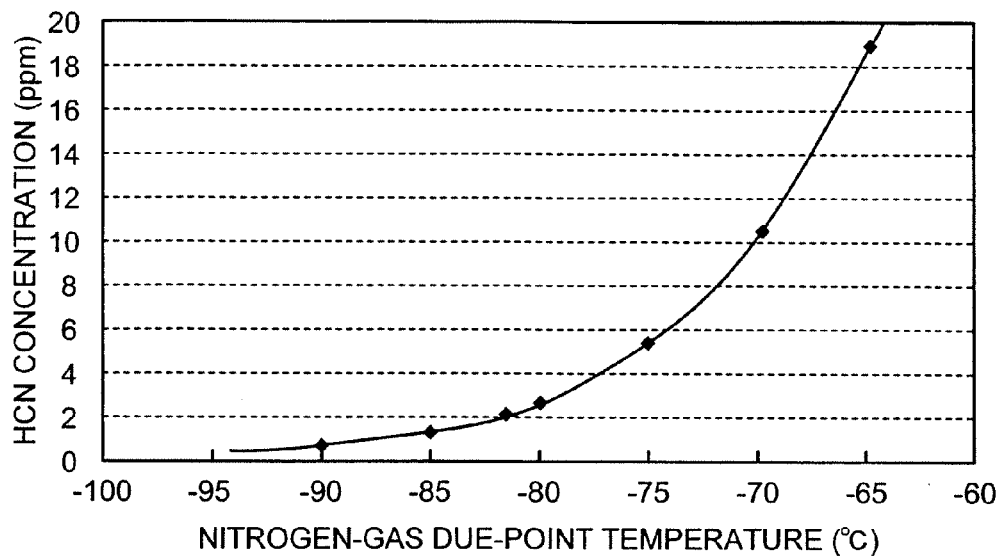
FIG. 3 is a graph for explaining a relation between a dew-point temperature of a nitrogen gas supplied into the graphite heating furnace and the HCN concentration inside the furnace body.

FIG. 3 is a graph for explaining a relation between a dew-point temperature of the nitrogen gas supplied by the nitrogen-gas supplying unit 8 and the HCN concentration inside the furnace body 6. The graph shown in FIG. 3 is a result obtained from an actual measurement when the temperature of the heater 4 is set to 1800K, and furnace body pressure is set to 200 Pa.

As shown in FIG. 3, the HCN concentration monotonically decreases as the dew-point temperature of the nitrogen gas decreases, and when the dew-point temperature of the nitrogen gas is equal to or lower than −80° C., an amount of change of the HCN concentration with respect to the dew-point temperature of the nitrogen gas becomes low, with a value of equal to or less than 3 ppm.

Therefore, it is desired to set the dew-point temperature of the nitrogen gas so that the HCN concentration inside the furnace body 6 with respect to the dew-point temperature of the nitrogen gas is substantially minimized, and more preferably, to a temperature equal to or lower than −80° C. When the dew-point temperature of the nitrogen gas is maintained within the above range, the HCN concentration inside the furnace body 6 becomes a level that does not cause a problem even if the gas inside the furnace body 6 is discharged to the atmosphere.

Based on the above result, in the graphite heating furnace 100, the nitrogen-gas supplying unit 8 sets the dew-point temperature of the nitrogen gas to equal to or lower than −80° C. The dew-point temperature of the nitrogen gas can be lowered by purifying the nitrogen gas by a purifying equipment (not shown) that is provided at a preceding stage of the nitrogen-gas supplying unit 8.

An example of a result of actual dehydration and sintering of the porous preform 1 by the graphite heating furnace 100 will be explained below. In a standby state in which the temperature of the heater 4 is about 1300K, the dew-point temperature of the nitrogen gas supplied by the nitrogen-gas supplying unit 8 is set to −90° C. with a fixed feed rate of 15 SLM, and the amount of exhausted by the exhausting unit 9 is controlled so that the furnace body pressure becomes 140 Pa. With the above setting, when the temperature of the heater 4 is 1900K at the dehydrating and sintering process, the HCN concentration inside the furnace body 6 is 5 ppm. At this moment, the HCN concentration at the place where there is an operator outside the furnace body 6 is equal to or less than 1 ppm, without a problem of indoor contamination.

As described above, in the graphite heating furnace 100, the amount of nitrogen gas supplied by the nitrogen-gas supplying unit 8 and the amount of gas exhausted from the furnace body 6 are controlled so that the HCN concentration inside the furnace body 6 with respect to the furnace body pressure is substantially minimized, and more specifically, the furnace body pressure becomes equal to or higher than 140 Pa with respect to the atmosphere outside the furnace body 6. In addition, in the graphite heating furnace 100, the nitrogen-gas supplying unit 8 sets the dew-point temperature of the nitrogen gas supplied into the furnace body 6 to a temperature with which the HCN concentration inside the furnace body 6 is kept low, more specifically, to a temperature equal to or lower than −80° C. With this scheme, in the graphite heating furnace 100, it is possible to suppress a generation of the hydrogen-cyanide gas even when the nitrogen gas is filled in the entire furnace body in which the muffle tube 3, the heater 4, and the heat insulating members 5a to 5c that are formed with the graphite are disposed.

Therefore, in the graphite heating furnace 100, the HCN concentration at a place where there is an operator can be maintained at a safe level, more specifically, a standard control concentration of equal to or less than 5 ppm, even if a part of the gas inside the furnace body 6 is discharged from the spaces 6a and 6b between the muffle tube 2 and the furnace body 6. Furthermore, in the graphite heating furnace 100, it is possible to seal the space between the muffle tube 2 and the furnace body 6 with a simple mechanism such as the seal member 7, because the gas inside the furnace body 6 can be discharged to the atmosphere so that the high airtightness is not required for a connection portion between the muffle tube 2 and the furnace body 6.

Figure 4:
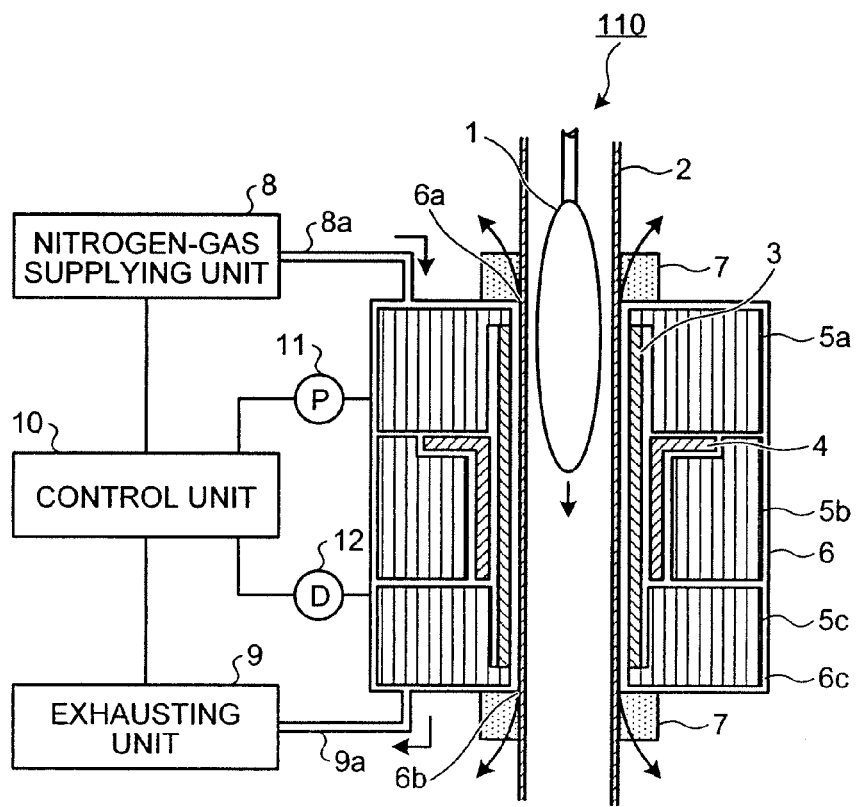
FIG. 4 is a schematic diagram for explaining a structure of a graphite heating furnace according to a second embodiment of the present invention.

FIG. 4 is a schematic diagram for explaining a structure of a graphite heating furnace 110 according to a second embodiment of the present invention. As shown in FIG. 4, the graphite heating furnace 110 is configured as a dehydration-sintering furnace that dehydrates and sinters the porous preform 1 in the same manner as the first embodiment, including a control unit 10 that controls at least one of the amount of the nitrogen gas supplied by the nitrogen-gas supplying unit 8 and the amount of gas exhausted by the exhausting unit 9, added to the graphite heating furnace 100 according to the first embodiment.

The control unit 10 performs a control of changing at least one of the amount of the nitrogen gas supplied by the nitrogen-gas supplying unit 8 and the amount of gas exhausted by the exhausting unit 9, so that the pressure inside the furnace body 6 is maintained in a positive pressure with respect to the atmosphere outside the furnace body 6 and in a predetermined pressure range as described above. The control unit 10 obtains the furnace body pressure as a result of detection by the pressure gauge 11. Based on the result of detection by the pressure gauge 11, when the pressure inside the furnace body 6 is too low, the control unit 10 increases the amount of nitrogen gas supplied by the nitrogen-gas supplying unit 8 or decreases the amount of gas exhausted by the exhausting unit 9.

In addition, the control unit 10 can detect the HCN concentration inside the furnace body 6 by using a concentration meter 12 that is provided on the furnace body 6. Based on a result of detection by the concentration meter 12 the control unit 10 can also change at least one of the amount of the nitrogen gas supplied by the nitrogen-gas supplying unit 8 and the amount of gas exhausted by the exhausting unit 9.

An example of a result of actual dehydration and sintering of the porous preform 1 by the graphite heating furnace 110 will be explained below. In a standby state in which the temperature of the heater 4 is about 1300K, the dew-point temperature of the nitrogen gas supplied by the nitrogen-gas supplying unit 8 is set to −90° C. with a fixed feed rate of 15 SLM, and the amount of exhausted by the exhausting unit 9 is controlled so that the furnace body pressure becomes 140 Pa. With the above setting, when the temperature of the heater 4 is 1900K at the dehydrating and sintering process, the HCN concentration inside the furnace body 6 is 5 ppm. At this moment, the HCN concentration at the place where there is an operator outside the furnace body 6 is equal to or less than 1 ppm, without a problem of indoor contamination.

However, if the dew-point temperature of the nitrogen gas supplied by the nitrogen-gas supplying unit 8 is set to −90° C. with a fixed feed rate of 15 SLM, when the furnace body pressure is set to 140 Pa in the standby state in which the temperature of the heater 4 is about 1300K, the furnace body pressure becomes 150 Pa at a dehydrating process in which the temperature of the heater 4 is 1500K and 160 Pa at a sintering process in which the temperature of the heater 4 is 1900K.

The feed rate of the nitrogen gas supplied by the nitrogen-gas supplying unit 8 is controlled so that the furnace body pressure becomes constant at 140 Pa even in the dehydrating process and the sintering process. As a result, the furnace body pressure can be maintained at 140 Pa by setting the feed rate of the nitrogen gas to 12 SLM in the dehydrating process and 8 SLM in the sintering process. In other words, in the graphite heating furnace 110, the usage amount of the nitrogen gas can be further decreased by maintaining the furnace body pressure at 140 Pa with a control of the amount of supplying the nitrogen gas in each of the dehydrating process and the sintering process.

Figure 5:
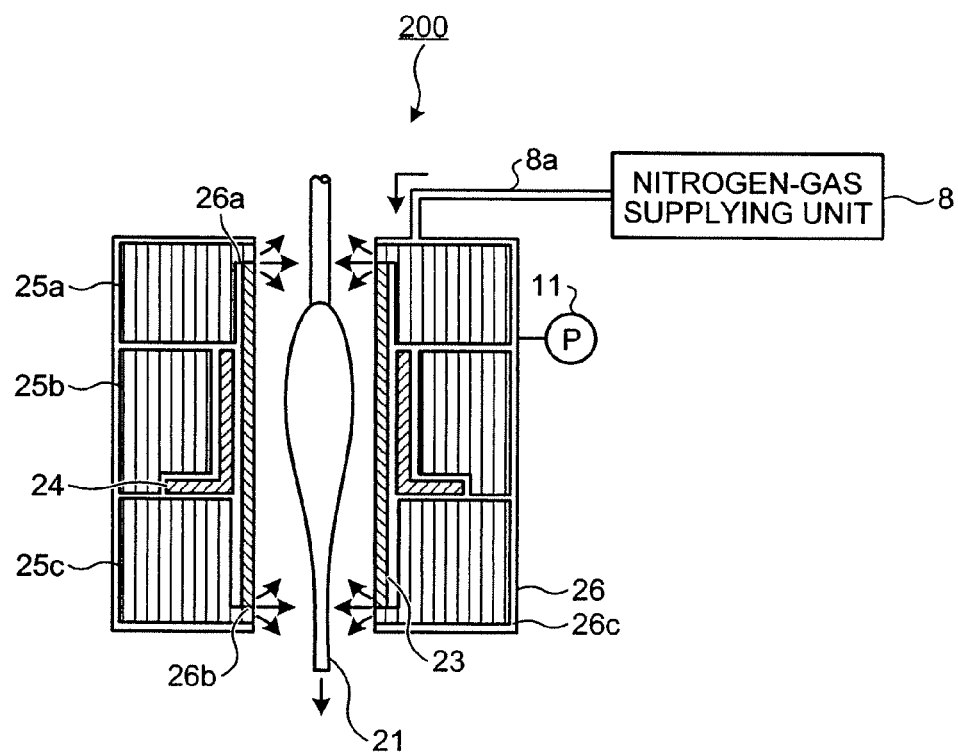
FIG. 5 is a schematic diagram for explaining a structure of a graphite heating furnace according to a third embodiment of the present invention.

FIG. 5 is a schematic diagram for explaining a structure of a graphite heating furnace 200 according to a third embodiment of the present invention. As shown in FIG. 5, the graphite heating furnace 200 is configured as an elongation-heating furnace that elongates a glass rod 21 such as an optical fiber preform, including a muffle tube 23 into which the glass rod 21 is introduced, a heater 24 that surrounds an outer circumference of the muffle tube 23, and heat insulating members 25a to 25c that surround an outer circumference of the muffle tube 23 or the heater 24. Each of the muffle tube 23, the heater 24, and the heat insulating members 25a to 25c is formed in a cylindrical shape using the graphite, and is arranged in a furnace body 26.

Holding units 26a and 26b, each of which is a protruding portion forming an "L" shape on the cross section shown in FIG. 5, are formed on inner-sides of an upper portion of the heat insulating member 25a and a lower portion of the heat insulating member 25c, respectively. The muffle tube 23 is held by the holding units 26a and 26b. The holding units 26a and 26b make the muffle tube 23 in contact with the heat insulating member 25a or the heat insulating member 25c, so that a sealing is made with permeability. The sealing can also be made by placing a ring-shaped sealing member formed with a glass, a carbon, or a ceramic on each of the holding units 26a and 26b, so that the sealing member is made into contact with the muffle tube 23 and the heat insulating members 25a and 25c. The glass rod 21 introduced into the muffle tube 23 is heated and melted in the muffle tube 23, and elongated by slowly letting down an upper portion of the glass rod 21 using a drawing mechanism (not shown) and letting down a lower portion of the glass rod 21 faster than the upper portion.

The graphite heating furnace 200 includes the nitrogen-gas supplying unit 8, the gas feeding tube 8a, and the pressure gauge 11 that are included in the graphite heating furnace 100. The nitrogen-gas supplying unit 8 supplies the nitrogen gas into the furnace body 26 through the gas feeding tube 8a that is connected to an upper portion of the furnace body 26. The dew-point temperature of the nitrogen gas supplied by the nitrogen-gas supplying unit 8 is set to a temperature with which the HCN concentration inside the furnace body 26 is kept low, more specifically, to a temperature equal to or lower than −80° C., in the same manner as the first embodiment.

The nitrogen gas introduced into the furnace body 26 is filled in a space 26c that is a space inside the furnace body 26 and formed by the muffle tube 23, the heater 24, and the heat insulating members 25a to 25c, so that inside the furnace body 26 becomes a nitrogen-gas atmosphere. With this scheme, in the graphite heating furnace 200, it becomes possible to prevent an oxidative consumption of the muffle tube 23, the heater 24, and the heat insulating members 25a to 25c, even when a temperature of the furnace body 26 becomes high.

Furthermore, in the graphite heating furnace 200, the amount of the nitrogen gas supplied by the nitrogen-gas supplying unit 8 is controlled so that the furnace body pressure becomes equal to or higher than 140 Pa with respect to the atmosphere outside the furnace body 26.

In this manner, in the graphite heating furnace 200, an amount of the hydrogen-cyanide gas generated by a reaction of the graphite that is used in the muffle tube 23, the heater 24, and the heat insulating members 25a to 25c with the nitrogen gas filled in the space 26c is suppressed. Therefore, the gas inside the furnace body 26 can be discharged to the atmosphere, i.e., a room where there is an operator, from the holding units 26a and 26b through a tube portion of the muffle tube 23. Then, the HCN concentration at a place where there is an operator can be maintained at a safe level, more specifically, a standard control concentration of equal to or less than 5 ppm, even if the gas inside the furnace body 26 is discharged to the atmosphere.

In addition, in the graphite heating furnace 200, it is possible to seal a boundary between the muffle tube 23 and the heat insulating members 25a and 25c with a simple mechanism such as the holding units 26a and 26b, because the gas inside the furnace body 26 can be discharged to the atmosphere so that the high airtightness is not required for the furnace body 26 with respect to the external air. Furthermore, because it is possible to discharge the gas inside the furnace body 26 to the atmosphere, it is not necessary to use a special exhaust-gas treatment equipment, and at the same time, it is not necessary to control an exhausting amount of the gas. Therefore, a configuration of the graphite heating furnace 200 can be simplified in terms of a design and a control mechanism.

An example of a result of actual elongation of the glass rod 21 by the graphite heating furnace 200 will be explained below. In a standby state in which the temperature of the heater 24 is about 1300K, the dew-point temperature of the nitrogen gas supplied by the nitrogen-gas supplying unit 8 is set to −90° C. with a fixed feed rate of 200 SLM, and the amount of the nitrogen gas supplied by the nitrogen-gas supplying unit 8 is controlled so that the furnace body pressure becomes 220 Pa. With the above setting, when the temperature of the heater 24 is 1900K, the HCN concentration inside the furnace body 26 is 4 ppm. At this moment, the HCN concentration at the place where there is an operator outside the furnace body 26 is equal to or less than 1 ppm, without a problem of indoor contamination.

Figure 6:
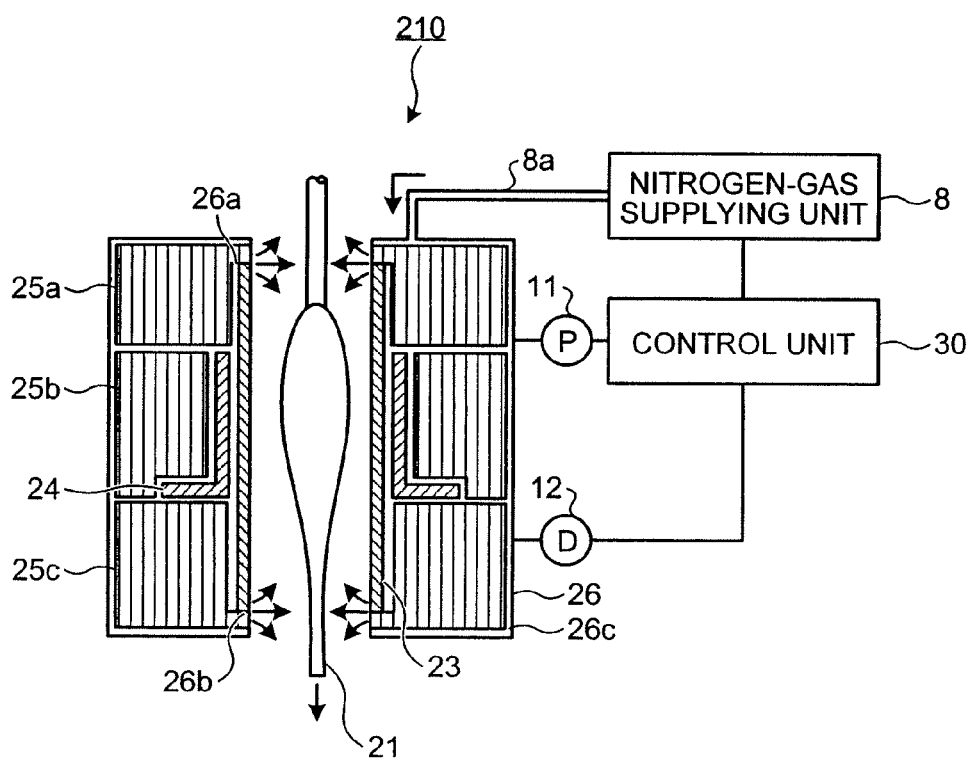
FIG. 6 is a schematic diagram for explaining a structure of a graphite heating furnace according to a fourth embodiment of the present invention.

FIG. 6 is a schematic diagram for explaining a structure of a graphite heating furnace 210 according to a fourth embodiment of the present invention. As shown in FIG. 6, the graphite heating furnace 210 is configured as an elongation-heating furnace that elongates the glass rod 21 in the same manner as the third embodiment, including a control unit 30 that controls the amount of the nitrogen gas supplied by the nitrogen-gas supplying unit 8, added to the graphite heating furnace 200 according to the third embodiment.

The control unit 30 performs a control of changing the amount of the nitrogen gas supplied by the nitrogen-gas supplying unit 8, so that the pressure inside the furnace body 26 is maintained in a positive pressure with respect to the atmosphere outside the furnace body 26, and at the same time, the HCN concentration inside the furnace body 26 is kept low. The control unit 30 obtains the furnace body pressure as a result of detection by the pressure gauge 11. Based on the result of detection by the pressure gauge 11, when the pressure inside the furnace body 26 is too low, the control unit 30 increases the amount of nitrogen gas supplied by the nitrogen-gas supplying unit 8.

In addition, the control unit 30 can detect the HCN concentration inside the furnace body 26 by using a concentration meter 12 that is provided on the furnace body 26. Based on a result of detection by the concentration meter 12 the control unit 30 can also change the amount of the nitrogen gas supplied by the nitrogen-gas supplying unit 8.

An example of a result of actual elongation of the glass rod 21 by the graphite heating furnace 210 will be explained below. In a standby state in which the temperature of the heater 24 is about 1300K, the dew-point temperature of the nitrogen gas supplied by the nitrogen-gas supplying unit 8 is set to −90° C. with a fixed feed rate of 200 SLM, and the amount of the nitrogen gas supplied by the nitrogen-gas supplying unit 8 is controlled so that the furnace body pressure becomes 220 Pa. With the above setting, when the temperature of the heater 24 is 1900K, the HCN concentration inside the furnace body 26 is 4 ppm. At this moment, the HCN concentration at the place where there is an operator outside the furnace body 26 is equal to or less than 1 ppm, without a problem of indoor contamination.

A control of changing the amount of the nitrogen gas supplied by the nitrogen-gas supplying unit 8 is performed based on the result of detection by the concentration meter 12. When the dew-point temperature of the nitrogen gas supplied by the nitrogen-gas supplying unit 8 is set to −90° C., if the HCN concentration inside the furnace body 26 detected by the concentration meter 12 is about to exceed 5 ppm, the amount of the nitrogen supplied by the nitrogen-gas supplying unit 8 is increased. As a result, the feed rate of the nitrogen gas that is 150 SLM in the standby state in which the temperature of the heater 24 is about 1300K is changed to 200 SLM at an elongating process in which the temperature of the heater 24 is about 1900K, and the pressure inside the furnace body 26 is changed from 140 Pa to 240 Pa, with the HCN concentration inside the furnace body 26 of 4 ppm. In this manner, in the graphite heating furnace 210, an overall usage amount of the nitrogen gas can be reduced, and at the same time, an amount of the hydrogen-cyanide gas generated inside the furnace body 26 can be suppressed for certain, by changing the amount of supplying the nitrogen gas according to the HCN concentration inside the furnace body 26.

Figure 7:
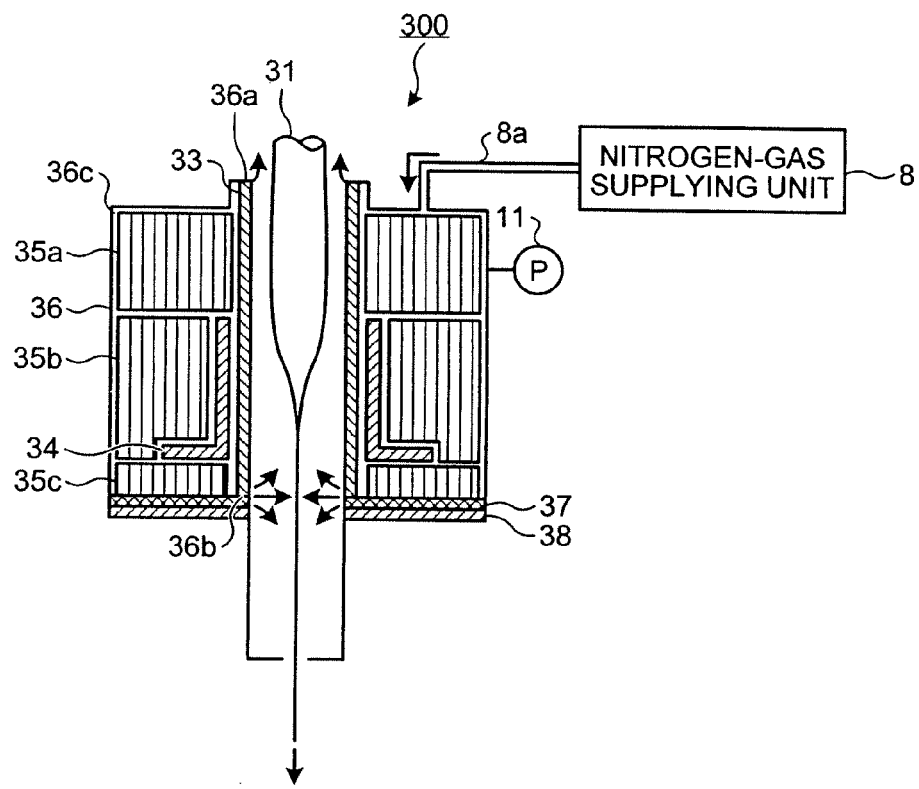
FIG. 7 is a schematic diagram for explaining a structure of a graphite heating furnace according to a fifth embodiment of the present invention.

FIG. 7 is a schematic diagram for explaining a structure of a graphite heating furnace 300 according to a fifth embodiment of the present invention. As shown in FIG. 7, the graphite heating furnace 300 is configured as a drawing-heating furnace that draws an optical fiber preform 31, including a muffle tube 33 into which the optical fiber preform 31 is introduced, a heater 34 that surrounds an outer circumference of the muffle tube 33, heat insulating members 35a to 35c that surround an outer circumference of the muffle tube 33 or the heater 34, and a carbon plate 37 and a glass plate 38 that function as heat insulating members disposed at lower parts of the heat insulating member 35c and the muffle tube 33.

Each of the muffle tube 33, the heater 34, and the heat insulating members 35a to 35c is formed in a cylindrical shape using the graphite, and is arranged in a furnace body 36. The carbon plate 37 and the glass plate 38 are formed in a hollow disk shape using the graphite and the silica glass, respectively, and are stacked on a bottom of the furnace body 36. Alternatively, a ceramic plate can be used instead of the carbon plate 37 and the glass plate 38.

The muffle tube 33 is held by a holding unit 36a that is a key-shaped upper portion of the furnace body 36 and a holding unit 36b that is a portion of the carbon plate 37. The holding units 36a and 36b make the muffle tube 33 into contact with the furnace body 36 or the carbon plate 37, so that a sealing is made with permeability. The optical fiber preform 31 introduced into the muffle tube 33 is heated and melted in the muffle tube 33, and drawn by a drawing mechanism (not shown).

The graphite heating furnace 300 includes the nitrogen-gas supplying unit 8, the gas feeding tube 8a, and the pressure gauge 11 that are included in the graphite heating furnace 100. The nitrogen-gas supplying unit 8 supplies the nitrogen gas into the furnace body 36 through the gas feeding tube 8a that is connected to an upper portion of the furnace body 36. The dew-point temperature of the nitrogen gas supplied by the nitrogen-gas supplying unit 8 is set to a temperature with which the HCN concentration inside the furnace body 36 is kept low, more specifically, to a temperature equal to or lower than −80° C. in the same manner as the first embodiment.

The nitrogen gas introduced into the furnace body 36 is filled in a space 36c that is a space inside the furnace body 36 and formed by the muffle tube 33, the heater 34, the heat insulating members 35a to 35c, and the carbon plate 37, so that inside the furnace body 36 becomes a nitrogen-gas atmosphere. With this scheme, in the graphite heating furnace 300, it becomes possible to prevent an oxidative consumption of the muffle tube 33, the heater 34, the heat insulating members 35a to 35c, and the carbon plate 37, even when a temperature of the furnace body 36 becomes high.

Furthermore, in the graphite heating furnace 300, the amount of the nitrogen gas supplied by the nitrogen-gas supplying unit 8 is controlled so that the furnace body pressure is becomes equal to or higher than 140 Pa with respect to the atmosphere outside the furnace body 36.

In this manner, in the graphite heating furnace 300, an amount of the hydrogen-cyanide gas generated by a reaction of the graphite that is used in the muffle tube 33, the heater 34, the heat insulating members 35a to 35c, and the carbon plate 37 with the nitrogen gas filled in the space 36c is suppressed. Therefore, the gas inside the furnace body 36 can be discharged to the atmosphere from the holding units 36a and 36b through tube portions of the muffle tube 33 and the furnace body 36, i.e., a room where there is an operator, from the holding units 36a and 36b through a tube portion of the muffle tube 33. Then, the HCN concentration at a place where there is an operator can be maintained at a safe level, more specifically, a standard control concentration of equal to or less than 5 ppm, even if the gas inside the furnace body 36 is discharged to the atmosphere.

In addition, in the graphite heating furnace 300, it is possible to seal a boundary between the muffle tube 33 and the furnace body 36 or the carbon plate 37 with a simple mechanism such as the holding units 36a and 36b, because the gas inside the furnace body 36 can be discharged to the atmosphere so that the high airtightness is not required for the furnace body 36 with respect to the external air. Furthermore, because it is possible to discharge the gas inside the furnace body 36 to the atmosphere, it is not necessary to use a special exhaust-gas treatment equipment, and at the same time, it is not necessary to control an exhausting amount of the gas. Therefore, a configuration of the graphite heating furnace 300 can be simplified in terms of a design and a control mechanism.

An example of a result of actual drawing of the optical fiber preform 31 by the graphite heating furnace 300 will be explained below. In a standby state in which the temperature of the heater 34 is about 1300K, the dew-point temperature of the nitrogen gas supplied by the nitrogen-gas supplying unit 8 is set to −90° C. with a fixed feed rate of 50 SLM, and the amount of the nitrogen gas supplied by the nitrogen-gas supplying unit 8 is controlled so that the furnace body pressure becomes 230 Pa. With the above setting, when the temperature of the heater 34 is 2200K, the HCN concentration inside the furnace body 36 is 5 ppm. At this moment, the HCN concentration at the place where there is an operator outside the furnace body 36 is equal to or less than 1 ppm, without a problem of indoor contamination.

Figure 8:
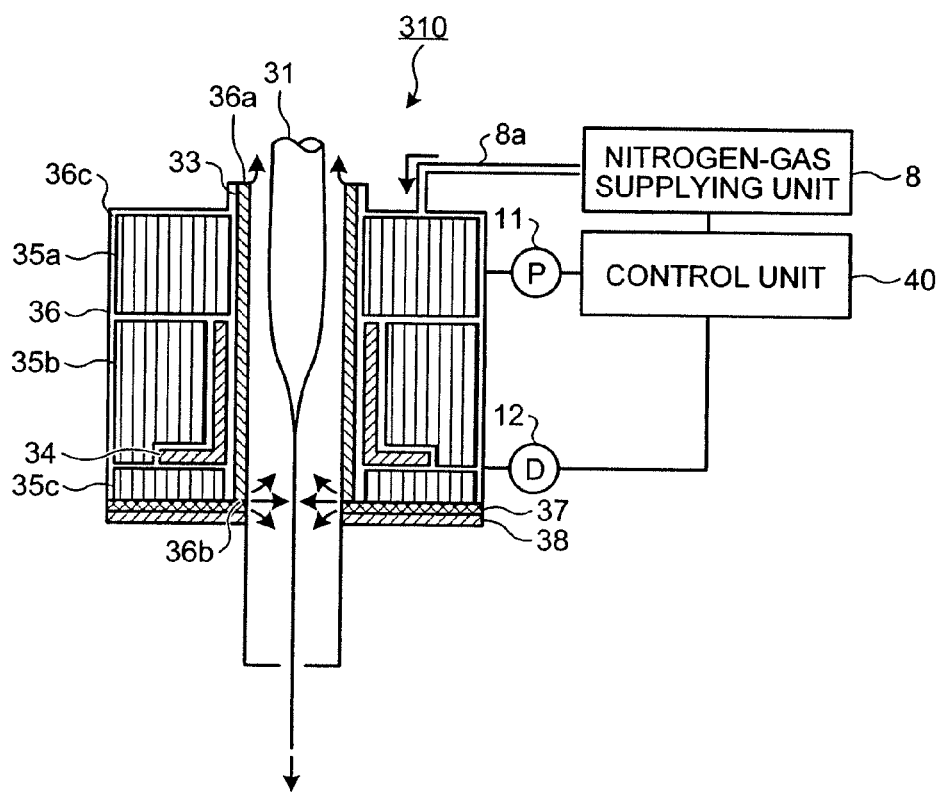
FIG. 8 is a schematic diagram for explaining a structure of a graphite heating furnace according to a sixth embodiment of the present invention.

FIG. 8 is a schematic diagram for explaining a structure of a graphite heating furnace 310 according to a sixth embodiment of the present invention. As shown in FIG. 8, the graphite heating furnace 310 is configured as a drawing-heating furnace that draws the optical fiber preform 31 in the same manner as the fifth embodiment, including a control unit 40 that controls the amount of the nitrogen gas supplied by the nitrogen-gas supplying unit 8, added to the graphite heating furnace 300 according to the fifth embodiment.

The control unit 40 performs a control of changing the amount of the nitrogen gas supplied by the nitrogen-gas supplying unit 8, so that the pressure inside the furnace body 36 is maintained in a positive pressure with respect to the atmosphere outside the furnace body 36, and at the same time, the HCN concentration inside the furnace body 36 is kept low. The control unit 40 obtains the furnace body pressure as a result of detection by the pressure gauge 11. Based on the result of detection by the pressure gauge 11, when the pressure inside the furnace body 36 is too low, the control unit 40 increases the amount of nitrogen gas supplied by the nitrogen-gas supplying unit 8.

In addition, the control unit 40 can detect the HCN concentration inside the furnace body 36 by using a concentration meter 12 that is provided on the furnace body 36. Based on a result of detection by the concentration meter 12 the control unit 40 can also change the amount of the nitrogen gas supplied by the nitrogen-gas supplying unit 8.

An example of a result of actual drawing of the optical fiber preform 31 by the graphite heating furnace 310 will be explained below. In a standby state in which the temperature of the heater 34 is about 1300K, the dew-point temperature of the nitrogen gas supplied by the nitrogen-gas supplying unit 8 is set to −90° C. with a fixed feed rate of 50 SLM, and the amount of the nitrogen gas supplied by the nitrogen-gas supplying unit 8 is controlled so that the furnace body pressure becomes 230 Pa. With the above setting, when the temperature of the heater 34 is 2200K, the HCN concentration inside the furnace body 36 is 5 ppm. At this moment, the HCN concentration at the place where there is an operator outside the furnace body 36 is equal to or less than 1 ppm, without a problem of indoor contamination.

A control of changing the amount of the nitrogen gas supplied by the nitrogen-gas supplying unit 8 is performed based on the result of detection by the concentration meter 12. Comparing the standby state with a drawing state, the hydrogen-cyanide gas is generated more during the drawing state in which the temperature of the heater 34 is relatively high. When the dew-point temperature of the nitrogen gas supplied by the nitrogen-gas supplying unit 8 is set to −90° C., if the HCN concentration inside the furnace body 36 detected by the concentration meter 12 is about to exceed 5 ppm, the amount of the nitrogen supplied by the nitrogen-gas supplying unit 8 is increased. As a result, the feed rate of the nitrogen gas that is 10 SLM in the standby state in which the temperature of the heater 34 is about 1300K is changed to 50 SLM at a drawing process in which the temperature of the heater 34 is about 2200K, and the pressure inside the furnace body 36 is changed from 160 Pa to 250 Pa, with the HCN concentration inside the furnace body 36 of 5 ppm. In this manner, in the graphite heating furnace 310, an overall usage amount of the nitrogen gas can be reduced, and at the same time, an amount of the hydrogen-cyanide gas generated inside the furnace body 36 can be suppressed for certain, by changing the amount of supplying the nitrogen gas according to the HCN concentration during the standby state and the drawing state.

So far, the first to the sixth embodiments have been explained as the exemplary embodiments of the present invention; however, the present invention is not limited to the above embodiments, but a variety of modification examples may also be included in a scope of the present invention. For instance, explanations said that only the graphite heating furnaces 100 and 110 includes the exhausting unit 9 as a mechanism capable of adjusting the amount of gas exhausting from the furnace body, according to the first to the sixth embodiments; however, the graphite heating furnaces 200, 210, 300, and 310 also can include the similar exhausting mechanism. On the contrary, the exhausting unit 9 can be removed from the graphite heating furnaces 100 and 110, so that the exhaustion is performed by discharging the gas only, in the same manner as the graphite heating furnaces 200, 210, 300, and 310. In addition, an exhaust-gas treatment equipment that further detoxifies the hydrogen-cyanide gas included in the exhaust gas can be provided at an subsequent stage of the exhausting unit 9.

Although the graphite heating furnace according to the present invention is explained as one of the a dehydration-sintering furnace, an elongation-heating furnace, and a drawing-heating furnace for heating an optical fiber preform, according to the first to the sixth embodiments, the present invention is not limited to the above examples, but can be applied to a variety of applications. Because the amount of hydrogen-cyanide gas generation increases as the temperature increases, when applying the graphite heating furnace according to the present invention to various usages, it is desired that the temperature inside the furnace body is maintained under 2200K.

As describe above, according to one aspect of the present invention, it is possible to suppress a generation of the hydrogen-cyanide gas with a simple structure, even when the nitrogen gas is filled in the entire furnace body.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A graphite heating furnace comprising:
a furnace body including graphite;
a reaction container in which an object to be heated is placed, wherein
the furnace body surrounds the reaction container,
an interior of the reaction container and an interior of the furnace body are separated by the reaction container with a space provided between an end of the furnace body and the reaction container, and
the space couples the interior of the furnace body to an atmosphere surrounding an outside of the furnace body such that gas can flow from the furnace body through the space directly to the atmosphere surrounding the outside of the furnace body;
a gas supplying unit to supply a nitrogen gas into the furnace body;
a purifying equipment to set a dew-point temperature of the nitrogen gas supplied into the furnace body to be equal to or lower than −80 degrees Celsius;
an exhausting unit to exhaust a gas including a hydrogen-cyanide gas inside the furnace body to the outside of the furnace body, the exhausting unit connected to an exhaust-gas treatment equipment to detoxify the gas exhausted;
the space is to discharge at least a part of the gas including the hydrogen-cyanide gas inside the furnace body directly to the atmosphere surrounding the outside of the furnace body;
a controller to execute a control of changing an amount of at least one of the nitrogen gas supplied to the furnace body and the gas exhausted from the furnace body to control a pressure inside the furnace body to be equal to or higher than 140 pascals with respect to an atmospheric pressure of the atmosphere outside the furnace body; and
a concentration detecting unit to detect a concentration of a hydrogen-cyanide gas inside the furnace body, wherein the controller is configured to control the amount of the at least one of the nitrogen gas supplied by the gas supplying unit and the gas exhausted from inside the furnace body by the exhausting unit, based on the detected concentration of the hydrogen-cyanide gas inside the furnace body.

2. The graphite heating furnace according to claim 1, wherein the controller maintains a temperature inside the furnace body to be equal to or lower than 2200 degrees Kelvin.

3. The graphite heating furnace according to claim 1, wherein the graphite heating furnace is one of a dehydration-sintering furnace that dehydrates and sinters an optical fiber porous preform, an elongation-heating furnace that elongates the optical fiber porous preform, and a drawing-heating furnace that draws the optical fiber porous preform.

4. The graphite heating furnace according to claim 1, further comprising:
   a pressure gauge detecting a pressure inside the furnace body,
   wherein the controller controls the amount of the at least one of the nitrogen gas supplied by the gas supplying unit and the gas exhausted from inside the furnace body by the exhausting unit, based on the detected pressure inside the furnace body.

5. The graphite heating furnace according to claim 1, wherein:
   the reaction container includes a muffle tube having a cylindrical structure formed with a silica, and
   the furnace body has a cylindrical shape which surrounds a portion of the muffle tube which extends in a long axis thereof, and incorporates a cylindrical heater.

6. The graphite heating furnace according to claim 5, wherein:
   a nitrogen gas filled space of the furnace body is sealed with permeability with the muffle tube.

7. The graphite heating furnace according to claim 6, further comprising:
   ring-shaped seal members at ends of the muffle tube which provide a permeable and elastic seal between the furnace body and the muffle tube.

\* \* \* \* \*